United States Patent [19]

Srock et al.

[11] Patent Number: 4,679,820
[45] Date of Patent: Jul. 14, 1987

[54] REINFORCING UNIT FOR A LONGITUDINAL BEARER

[75] Inventors: Rainer Srock, Leonberg; Ursula Herrmann, Weissach-Flacht; Bernhard v. Rotberg, Hemmingen, all of Fed. Rep. of Germany

[73] Assignee: Dr. Ing. h.c.F. Porsche Aktiengesellschaft, Fed. Rep. of Germany

[21] Appl. No.: 777,531

[22] Filed: Sep. 19, 1985

[30] Foreign Application Priority Data

Sep. 20, 1984 [DE] Fed. Rep. of Germany ....... 3434452

[51] Int. Cl.$^4$ ............................................. B62D 21/02
[52] U.S. Cl. .................................. 280/781; 296/188; 296/194; 296/204
[58] Field of Search ............... 180/311; 280/781, 755, 280/779, 780, 785, 790, 152 R; 296/188, 194, 204, 185, 198

[56] References Cited

U.S. PATENT DOCUMENTS

| 2,087,552 | 7/1937 | Rossmann | 280/152 R |
| 2,140,476 | 12/1938 | Ledwinka | 280/152 R |
| 3,423,123 | 1/1969 | Wessells III | 296/185 |
| 4,469,368 | 9/1984 | Eger | 296/194 |

FOREIGN PATENT DOCUMENTS

| 1139396 | 11/1962 | Fed. Rep. of Germany . |
| 1430738 | 3/1971 | Fed. Rep. of Germany . |
| 141971 | 8/1983 | Japan . |

Primary Examiner—John J. Love
Assistant Examiner—Karin L. Ferriter
Attorney, Agent, or Firm—Barnes & Thornburg

[57] ABSTRACT

A reinforcing unit for a longitudinal bearer of a body structure of a passenger motor vehicle which serves for the supported mounting of a transversely arranged auxiliary bearer for the support of a lower wheel guide member, for the fastening of a steering mechanism and for the mounting of drive aggregates or parts of the force transmission. Within the offset area of each longitudinal bearer, a form-rigid body is formed composed of several shell-like shaped elements and closure panels. The form-rigid body is constructed at least partially as box profile and forms together with the U-profile-shaped longitudinal bearer a fixedly connected structural unit with an abutment surface for the fastening of the auxiliary bearer.

11 Claims, 9 Drawing Figures

REINFORCING UNIT FOR A LONGITUDINAL BEARER

The present invention relates to a reinforcing unit for a longitudinal bearer of a body structure of a passenger motor vehicle for the supporting mounting of a transversely arranged auxiliary bearer serving for the bearing support of a lower wheel guide member and for the fastening of a steering mechanism and for the mounting of drive aggregates or parts of the force transmission.

In a known construction, a cross bearer, respectively a sub-frame or bogey is secured at the longitudinal bearers of a body structure of a passenger motor vehicle, on which the wheel guide members are retained on the outer side thereof. Such a support of the wheel guide members is not suited to absorb safely the forces coming from the wheel and introduced into the body structure by the wheel suspension in the case of dynamic loads, for example, during a crash or during driving demands. Owing to the relatively high forces which are introduced point-like, it may lead to certain yieldingnesses in the bearer area of the support area of the support place as a consequence of high loads and stresses and thus to undesired displacements or to disadvantageous deformation appearances.

It is the object of the present invention to provide a reinforcing unit at a particularly endangered location of a longitudinal bearer within the area of the support place of a wheel guide member, by means of which a relatively rigid connection with the longitudinal bearer is realizable.

The underlying problems are solved according to the present invention in that within the area of offset of each longitudinal bearer, a form-rigid body composed of several shell-like shaped elements and closure panels is formed which is constructed at least partially as box profile and forms together with the U-profile-shaped longitudinal bearer a rigidly connected structural unit having an abutment surface for the fastening of the auxiliary bearer.

The principal advantages achieved with the present invention consist in that a reinforcement of the support place of a wheel guide member or of an auxiliary frame for the mounting of steering parts, drive aggregates or parts of the force transmission which can be manufactured in a simple manner, is achieved by a box-shaped profile that runs out from the longitudinal bearer into the floor structure on a relatively long bases. The structure of the body, respectively, of the floor area at the support place of the wheel suspension is improved as regards both the reinforcment and the improved force absorption as also as regards a better crash behavior, i.e., a reinforcement of the longitudinal bearer at a relatively sensitive drop or offset location with a view toward a force interaction in the vehicle longitudinal direction. In an advantageous manner, the wheel housing inner body panels are utilizied for the reinforcement of the unit in that it is rigidly connected with the longitudinal bearer as also with the shell-shaped elements and forms a structural unit.

Owing to the connection of the first with the second shaped element, a rigid connection results in the longitudinal, transverse and vertical direction. The first shaped element is thereby secured essentially at the web outer surface of the longitudinal bearer and the second shaped element is connected in part with a leg of the longitudinal bearer and with a floor panel. The additional rigid tying to the longitudinal bearer as well as to the floor panel produces a reinforcement in all load directions so that undesired torsions and bending stresses are far-reachingly prevented. The introduction of the force flow on a wide bases by way of the second shaped element into the floor structure produces in an advantageous manner a favorable load distribution.

The auxiliary bearer extends transversely to the vehicle and is arranged underneath the connection of the shaped elements and is connected with the overall unit by threaded means. A steering mechanism is retained within the area between the fastening places of both vehicle sides.

These and other objects, features and advantages of the present invention will become more apparent from the following description when taken in connection with the accompanying drawing which shows, for purposes of illustration only, one embodiment in accordance with the present invention, and wherein.

Figure 1:
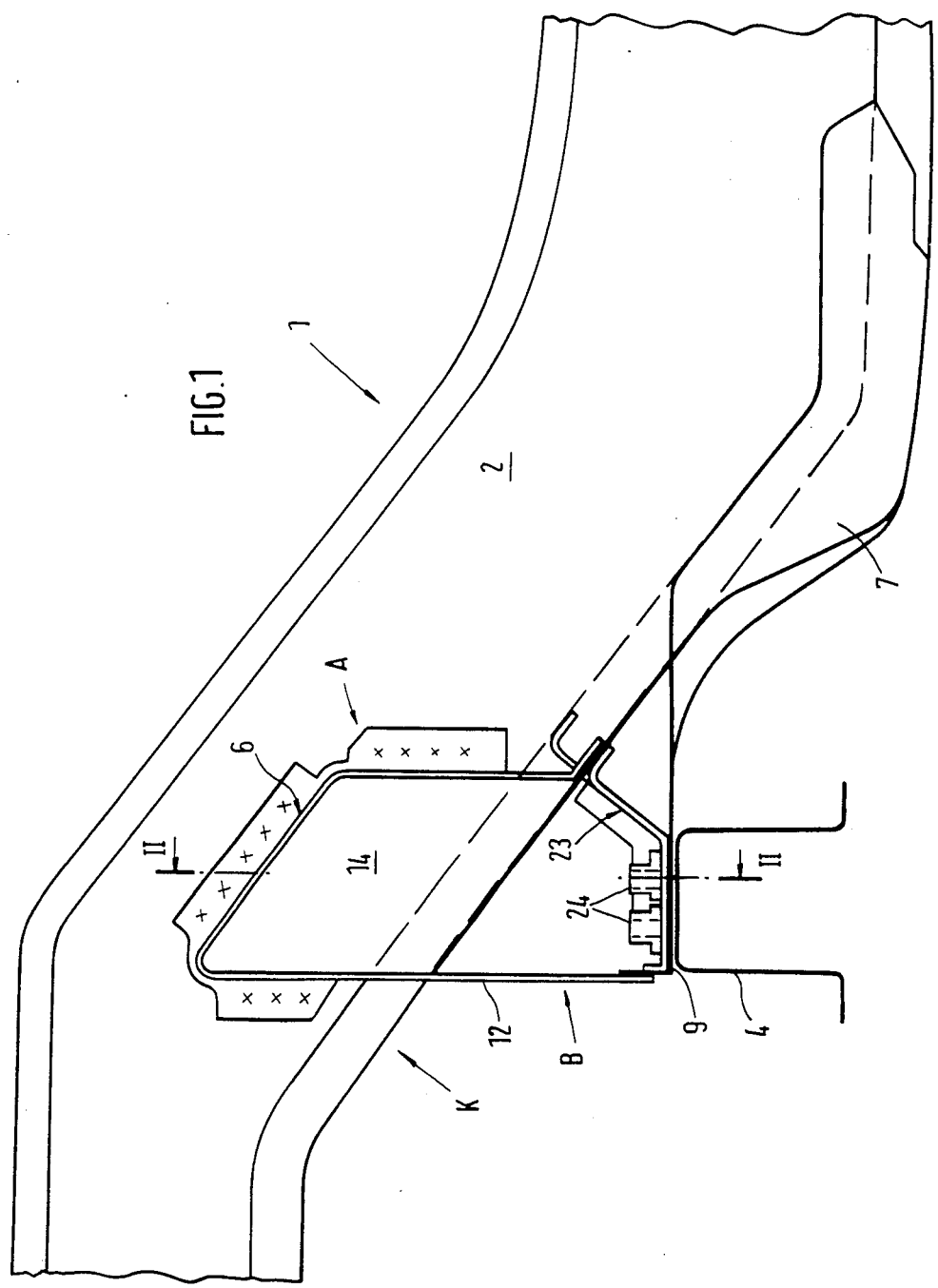
FIG. 1 is a side elevational view of a reinforcing unit in accordance with the present invention of the left vehicle side.
Figure 2:
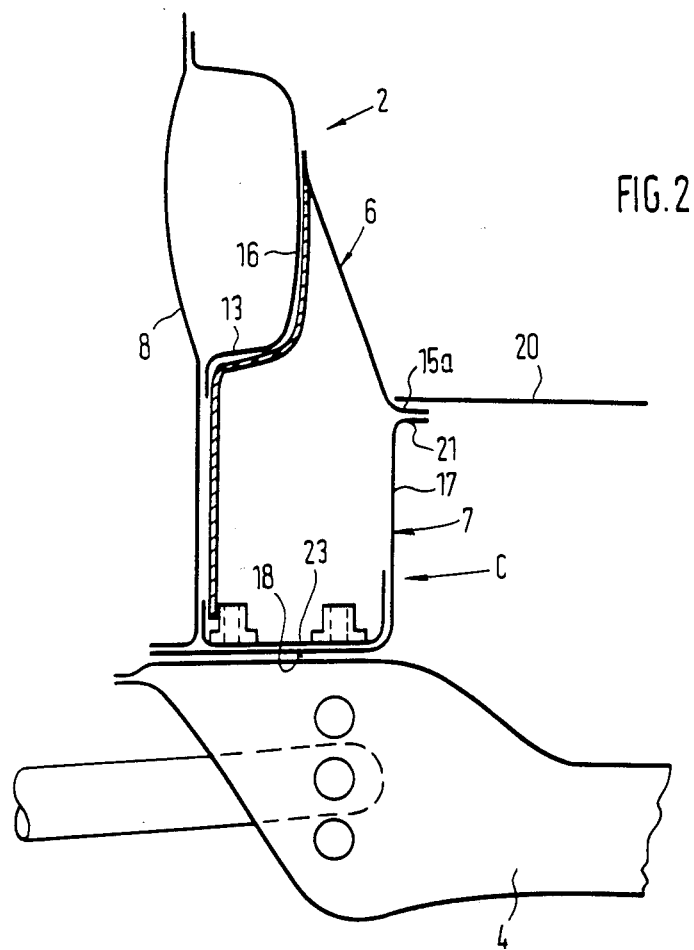
FIG. 2 is a cross-sectional view taken along line II—II of FIG. 1.
Figure 3:
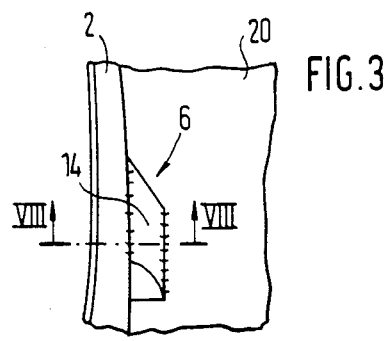
FIG. 3 is a plan view on a first shell-like shaped element of the reinforcing unit of the present invention.
Figure 4:
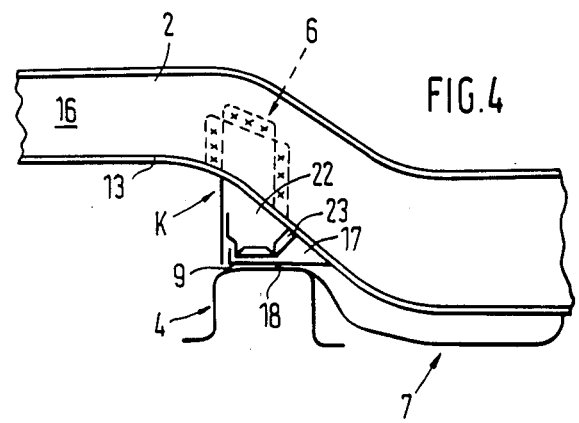
FIG. 4 is a side elevational view of the reinforcing unit with the wheel housing inner sheet metal panel omitted.
Figure 5:
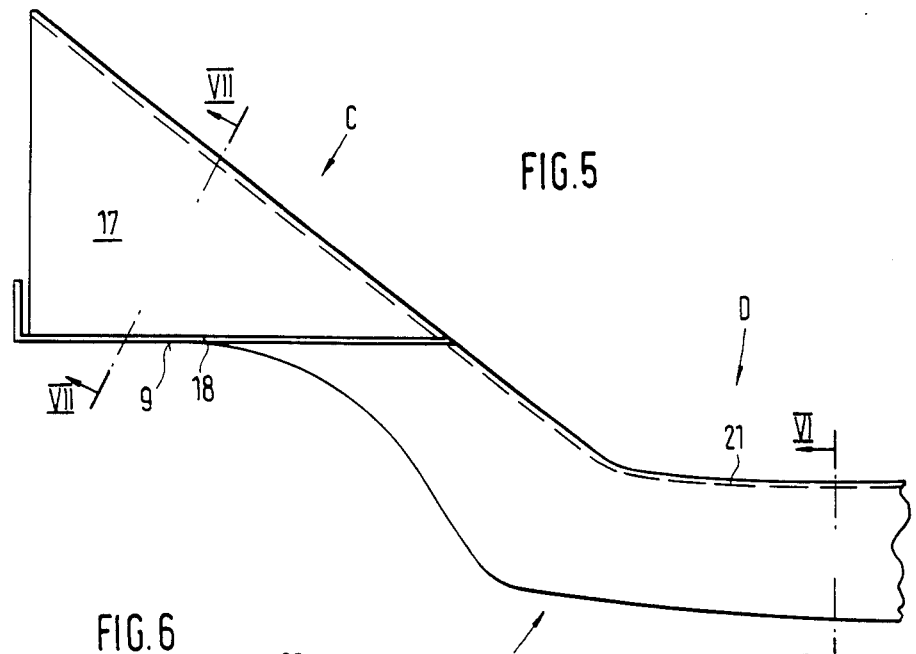
FIG. 5 is a side elevational view of a second shell-like shaped element.
Figure 9:
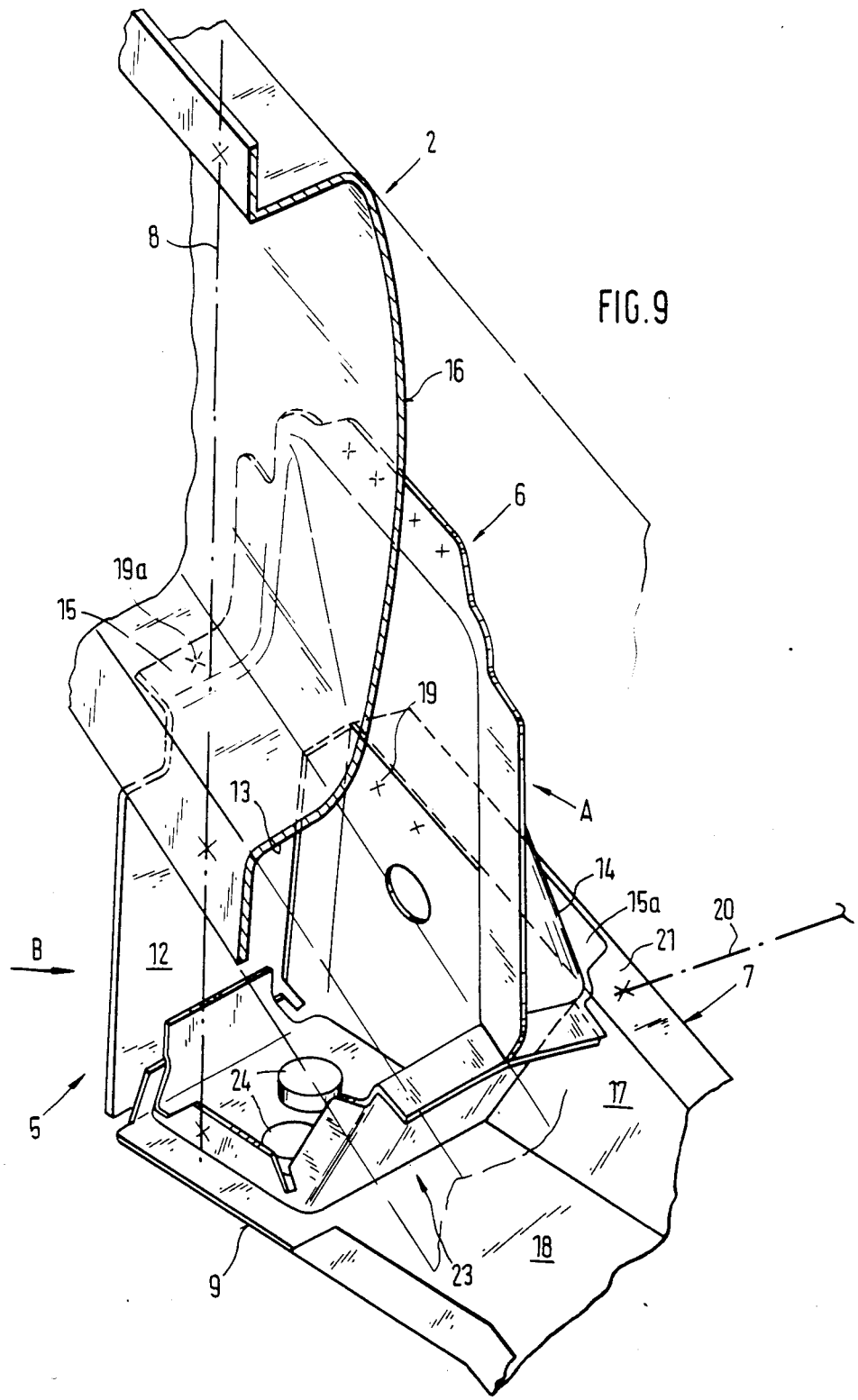
FIG. 9 is a perspective view partly broken away of the reinforcing unit in accordance with the present invention with indicated longitudinal bearer and wheel housing inner panel.

Referring now to the drawings wherein like reference numerals are used throughout the various views to designate like parts, two longitudinal bearers 2 are provided in a body structure generally designated by reference numeral 1 of a passenger motor vehicle, not illustrated in detail, on each side of the vehicle, which are provided with reinforcing unit for the fastening of a transversely arranged auxiliary bearer in the drop or offset area K (FIGS. 1 and 4). The reinforcing unit includes essentially two shell-like shaped elements generally designated by reference numerals 6 and 7 as well as at least one closure panel 8. The shaped elements 6 and 7 as well as the closure panel 8 form a form-rigid body which is constructed at least in part as box profile generally designated by reference numeral 5 (FIG. 9), whereby the box profile has a differing cross section. The reinforcing unit is arranged in such a manner within the drop or offset area K of the longitudinal bearer 2 that a "support lug" protruding from the bottom side of the longitudinal bearer 2 results which forms a horizontally arranged support and abutment surface 9 for the auxiliary bearer 4 on which the wheel guide members are retained, as indicated in FIG. 2.

The two shaped elements 6 and 7 are preferably arranged in such a manner to the longitudinal bearer 2 that an optimal load absorption corresponding to the occurrig loads results. For that purpose, the first shaped element 6 extends approximately column-shaped in a vertical plane, and the second shaped element 7 is matched approximately to the contour of the longitudinal bearer 2 and is securely connected with the first shaped element 6 as well as with the longitudinal bearer 2. In particular, the shaped element 7 extends at an inclination to the vehicle longitudinal center axis of the vehicle, respectively, the shaped elements 7 of both vehicle sides are arranged divergingly in relation to the driving direction.

The first shaped element 6 includes an upper section A (FIGS. 1 and 9) which is constructed U-profile-shaped and a further lower section B which consists of a wall 12 extending transversely thereto. The wall 12 extends underneath the longitudinal bearer 2 along a leg 13 and is connected with the latter, an angularly bent flange 15 serving for that purpose. Adjoining the wall 12, the U-profile upper section A is extended to the web surface 16 of the longitudinal bearer 2 and runs out thereat approximately centrally of the web 16 under continuous reduction of its cross section. The first shaped element 6 is fixedly connected with the longitudinal bearer 2 all around its entire circumference by way of end flanges at its web surface 14.

Figure 6:
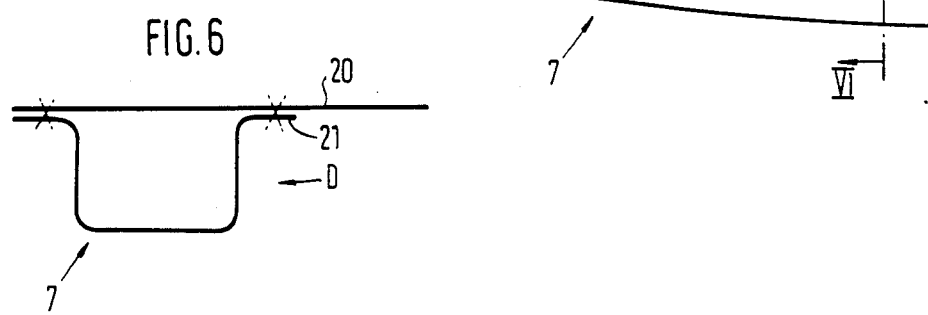
FIG. 6 is a somewhat schematic cross-sectional view through the second shaped element according to line VI—VI of FIG. 5.
Figure 7:
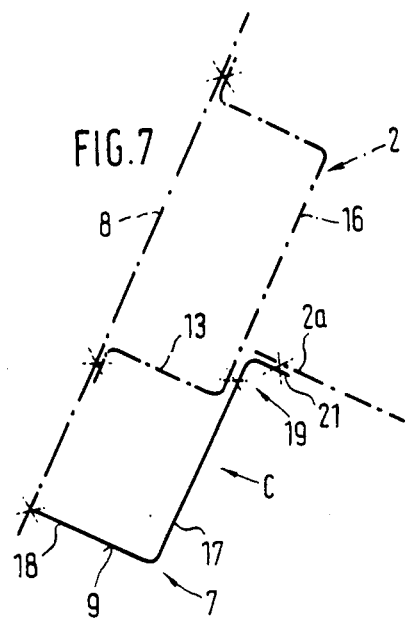
FIG. 7 is a somewhat schematic cross-sectional view through the shaped element taken along line VII—VII of FIG. 5 with the longitudinal bearer and wheel housing inner body panel indicated in dash-and-dotted lines.
Figure 8:
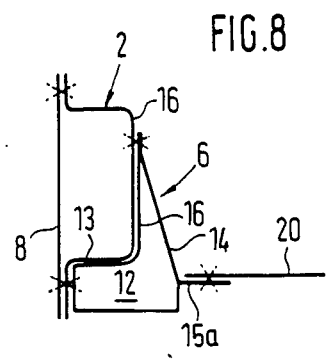
FIG. 8 is a somewhat schematic cross-sectional view taken along line VIII—VIII of FIG. 3.

The second shaped element 7 is also connected with the first shaped element 6 for example, by spot welding and forms with the latter a structural unit. It consists of an elongated part and is constructed U-profile-shaped (section D) over a great length (FIG. 6). Within the connecting area with the first shaped element 6, the second shaped element 7 has an angularly shaped configuration (section C) (FIG. 7) which passes over into the U-profile-shaped configuration at the abutment at the longitudinal bearer 2.

The angularly shaped section C includes a vertical wall 17 extending correspondingly to the web surface 16 of the longitudinal bearer 2 and a horizontally extending further wall 18 bent at right angle thereto. The further wall 18 extends nearly over the entire width of the lower leg 13 of the longitudinal bearer 2 and abuts end-face with the vertical and transversely extending wall 12 of the first shaped element 6 and is connected therewith. A connection to the longitudinal bearer 2 takes place by way of the vertical wall 12 at 19a (FIG. 9) by way of the flange 15 and at the second shaped element 7 at 19 at the web 16 of the longitudinal bearer 2, whereby a connnection with the floor panel 20 takes place by way of the flanges 15a and 21. These flanges 15a and 21 of the two shaped elements 6 and 7 are constructed in such a manner that they are disposed mutually opposite one another and accommodate the floor plate either between the same or resting thereon.

The transversely extending vertical wall 12 of the first shaped element 6 and the angularly shaped profile (wall 17 and 18) of the seond shaped element 7 form an approximately triangularly shaped space 22 (FIG. 4) within the offset area K of the longitudinal bearer 2. A support member 23 is provided in this space 22 for the reinforcement which, on the one hand, is connected with the lower leg 13 of the longitudinal bearer 2 and, on the other hand, with the walls 17 and 18 of the second shaped element 7 as well as with the wall 12. For fastening the auxiliary bearer 4, corresponding fastening elements such as welded nuts or the like are provided.

The U-profile-shaped longitudinal bearer 2 which is open toward the outside as well as the space 22 formed by the two shaped elements 6 and 7 is closed off by one or several closure panels 8 whereby preferably the wheel well inner panel serves as closure plate. However, it is also possible to let the wheel housing inner panel terminate with the flange of the longitudinal bearer 2 and to provide a one-piece closure plate for the space 22.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A reinforcing unit in combination with a U-profile-shaped longitudinal extending bearer and a transversely arranged auxiliary bearer of a body structure of a passenger motor vehicle said transversely arranged auxiliary bearer providing for the support thereon of a lower wheel guide member and for the fastening of a steering mechanism and for the mounting of drive aggregates or parts of the force transmission, said reinforcing unit comprising form rigid-body means connected to the U-shaped longitudinal bearer and composed of several shell shaped elements and of closure panel means connected together within a vertical offset area of each longitudinal bearer, the form-rigid body means being constructed at least partly as box profile and forming together with the U-profile-shaped longitudinal bearer a fixedly connected structural unit having an abutment surface means for fastening the transversely extending auxiliary bearer to the longitudinal extending bearer at the vertical offset area, the shell shaped elements including a first shaped element connected, with a vertical web on the inside of the longitudinal bearer, the first shaped element having a transversely extending wall leading vertically away from the longitudinal bearer and being connected with a second shaped element for forming the abutment surface means within the vertical offset area of the longitudinal bearer and wherein the first shaped element extends in sloping and straight vertical planes defining a trapazoidal column and the second shaped element extends from the offset area obliquely to the vehicle longitudinal center axis in a horizontal plane matched substantially to the configuration of the longitudinal bearer.

2. A unit according to claim 1, wherein the first shaped element is constructed with a U-profiled-shape and a transversely arranged arranged auxiliary bearer, the vertical wall extending transversely thereto and facing the vertical web of the longitudinal bearer and terminating in a surface of the web at a top edge of the first shaped element, the transversely extending wall of first shaped element extending underneath the longitudinal bearer approximately over the entire width of a lower leg of the longitudinal bearer.

3. A unit according to claim 2, wherein the second shaped element has an angularly shaped part within the vertical offset.

4. A unit according to claim 3, wherein the angularly shaped section of the second shaped element includes a vertical wall extending in the longitudinal direction of the longitudinal bearer and a further horizontal wall angularly bent at substantially right angle thereto, the vertical wall being connected with the web of the longitudinal bearer and having an angularly bent flange, and the horizontal wall extending approximately over the entire width of the lower leg and being fixedly connected end-face with the vertical wall of the first shaped element.

5. A unit according to claim 4, wherein the U-profile-shaped section of the first shaped element includes an outwardly bent-off flange as lower closure which is constructed together with the oppositely disposed flange of the second shaped element for the connection with a vehicle floor.

6. A unit according to claim 5, wherein the horizontally arranged abutment surface means projecting downwardly from the longitudinal bearer is connected with the longitudinal bearer by way of a support member as an additional reinforcing element.

7. A unit according to claim 6, wherein fastening elements for the retention of the auxiliary bearer are provided on the inside of the abutment surface means on the support member.

8. A unit according to claim 7, wherein the vertical wall of the first shaped element is connected directly with the walls of the angularly shaped part of the second shaped element and wherein a forward closure panel means completing the box profile is connected with the longitudinal bearer, with the support member and with the two shaped elements.

9. A unit according to claim 8, wherein the closure panel means is part of the wheel housing inner panel.

10. A reinforcing unit in combination with a U-profile-shaped longitudinal extending bearer and a transversely arranged auxiliary bearer of a body structure of a passenger motor vehicle said transversely arranged auxiliary bearer providing for the support thereon of a lower wheel guide member and for the fastening of a steering mechanism and for the mounting of drive aggregates or parts of the force transmission, said reinforcing unit, comprising form rigid body means connected to the U-shaped longitudinal bearer and composed of several shell shaped elements and of closure panel means connected together with a vertical offset area of each longitudinal bearer, the form-rigid body means being constructed at least partly as box profile and forming together with the U-profile-shaped longitudinal bearer a fixedly connected structural unit having an abutment surface means for fastening the transversely extending auxiliary bearer to the longitudinal extending bearer at the vertical offset area, wherein a first shaped element extends in sloping and straight vertical planes defining a trapazoidal column and a second shaped element extends from the offset area obliquely to the vehicle longitudinal center axis in a horizontal plane matched substantially to the configuration of the longitudinal bearer.

11. A reinforcing unit in combination with a U-profile-shaped longitudinal extending bearer and a transversely arranged auxiliary bearer of a body structure of a passenger motor vehicle said transversely arranged auxiliary bearer for the support thereon of a lower wheel guide member and for the fastening of a steering mechanism and for the mounting of drive aggregates or parts of the force transmission, said reinforcing unit comprising form rigid body means connected to the shaped elements and of closure panel means connected together within a vertical offset area of each longitudinal bearer, the form-rigid body means being constructed at least partly as box profile and forming together with the U-profile-shaped longitudinal bearer a fixedly connected structural unit having an abutment surface means for fastening the transversely extending auxiliary bearer to the longitudinal extending bearer at the vertical offset area wherein said shell shaped elements include a second shaped element having an angularly shaped section within the vertical offset area, wherein the angularly shaped section of the second shaped element includes a vertical wall extending in the longitudinal direction of the longitudinal bearer and a further horizontal wall angularly bent at substantially right angle thereto, the vertical wall being connected with the web of the longitudinal bearer and having an angularly bent flange, and the horizontal wall extending approximately over the entire width of the longitudinal bearer and being fixedly connected end-face with a vertical wall of a first shaped element.

* * * * *